US008023482B2

(12) United States Patent
Gong et al.

(10) Patent No.: US 8,023,482 B2
(45) Date of Patent: Sep. 20, 2011

(54) DYNAMIC RATE LIMITING IN WIRELESS MESH NETWORKS

(75) Inventors: Xiaohong Gong, Milpitas, CA (US); Bretton Lee Douglas, San Jose, CA (US); Robert B. O'Hara, Jr., Santa Clara, CA (US); Brian Donald Hart, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 844 days.

(21) Appl. No.: 11/686,823

(22) Filed: Mar. 15, 2007

(65) Prior Publication Data

US 2008/0225737 A1 Sep. 18, 2008

(51) Int. Cl.
*H04W 4/00* (2009.01)

(52) U.S. Cl. ........ 370/338; 375/285; 375/347; 375/210; 375/380; 375/375; 370/381; 370/514; 370/575

(58) Field of Classification Search .................. 370/338, 370/381, 514, 575
See application file for complete search history.

(56) References Cited

U.S. PATENT DOCUMENTS

| | | | | |
|---|---|---|---|---|
| 7,630,326 | B1* | 12/2009 | Shear | 370/254 |
| 2003/0007456 | A1* | 1/2003 | Gupta et al. | 370/232 |
| 2003/0045237 | A1* | 3/2003 | Gardner et al. | 455/63 |
| 2003/0185243 | A1* | 10/2003 | Klotsche | 370/498 |
| 2003/0193895 | A1* | 10/2003 | Engwer et al. | 370/241 |
| 2004/0252643 | A1* | 12/2004 | Joshi | 370/238 |
| 2005/0153702 | A1* | 7/2005 | Cuffaro et al. | 455/452.1 |
| 2005/0232179 | A1* | 10/2005 | daCosta et al. | 370/315 |
| 2007/0099624 | A1* | 5/2007 | Guo | 455/453 |
| 2007/0127380 | A1* | 6/2007 | Abraham et al. | 370/235 |
| 2007/0206547 | A1* | 9/2007 | Gong et al. | 370/338 |
| 2008/0186849 | A1* | 8/2008 | Kampmann et al. | 370/232 |

FOREIGN PATENT DOCUMENTS

WO    WO 2007/012819 A1    2/2007

OTHER PUBLICATIONS

Gambiroza, Violeta, et al., "End to End Performance and Fairneses in Multihop Wireless Backhaul Networks", Department of Electrical and Computer Engineering, Rice University, Houston, TX, MobiCom '04, Sep. 26-Oct. 1, 2004.

Camp, J. et al., "Measurement Driven Depoyment of a Two-Tier Urban Mesh Access Network", Rice Networks Group, MobiSys 2006, Jun. 20, 2006.

Chimento, P.F., "Standard Token Bucket Terminology", May 18, 2000.

(Continued)

*Primary Examiner* — Kamran Afshar
*Assistant Examiner* — Edward Zhang
(74) *Attorney, Agent, or Firm* — Baker Botts L.L.P.

(57) ABSTRACT

A dynamic rate limiting mechanism for wireless mesh networks. In particular implementations, a method comprising monitoring one or more clients associated with a wireless mesh network and the respective hop counts of the clients to a root mesh node of the wireless mesh network; determining, responsive to one or more events, a client data rate for one or more clients of the wireless mesh network based on the number of current clients and the respective hop counts of the current clients; and applying the client data rate to the wireless mesh network.

21 Claims, 5 Drawing Sheets

OTHER PUBLICATIONS

Green, Scott, "New Metromesh OS Release 5.1 from Tropos Delivers Next-Generation Metro-Scale Wi-Fi Capacity and Reliability" CLS Communications, Inc., Tropos Networks, Mar. 9, 2006.
Notification of Transmittal of the International Search Report and the Written Opinion of the International Search Authority, or the Declaration for PCT/US08/056457 filed Mar. 11, 2008, Jul. 14, 2008.

Jianfeng Chen et al. "A Bandwidth Allocation Model with High Concurrence Rate in IEEE802.16 Mesh Mode" Communications, 2005 Asia-Pacific Conference on Perth, Western Australia Oct. 3-5, 2005, Piscataway, NJ, USA, IEEE, Oct. 3, 2005 pp. 750-754, Oct. 3, 2005.

* cited by examiner

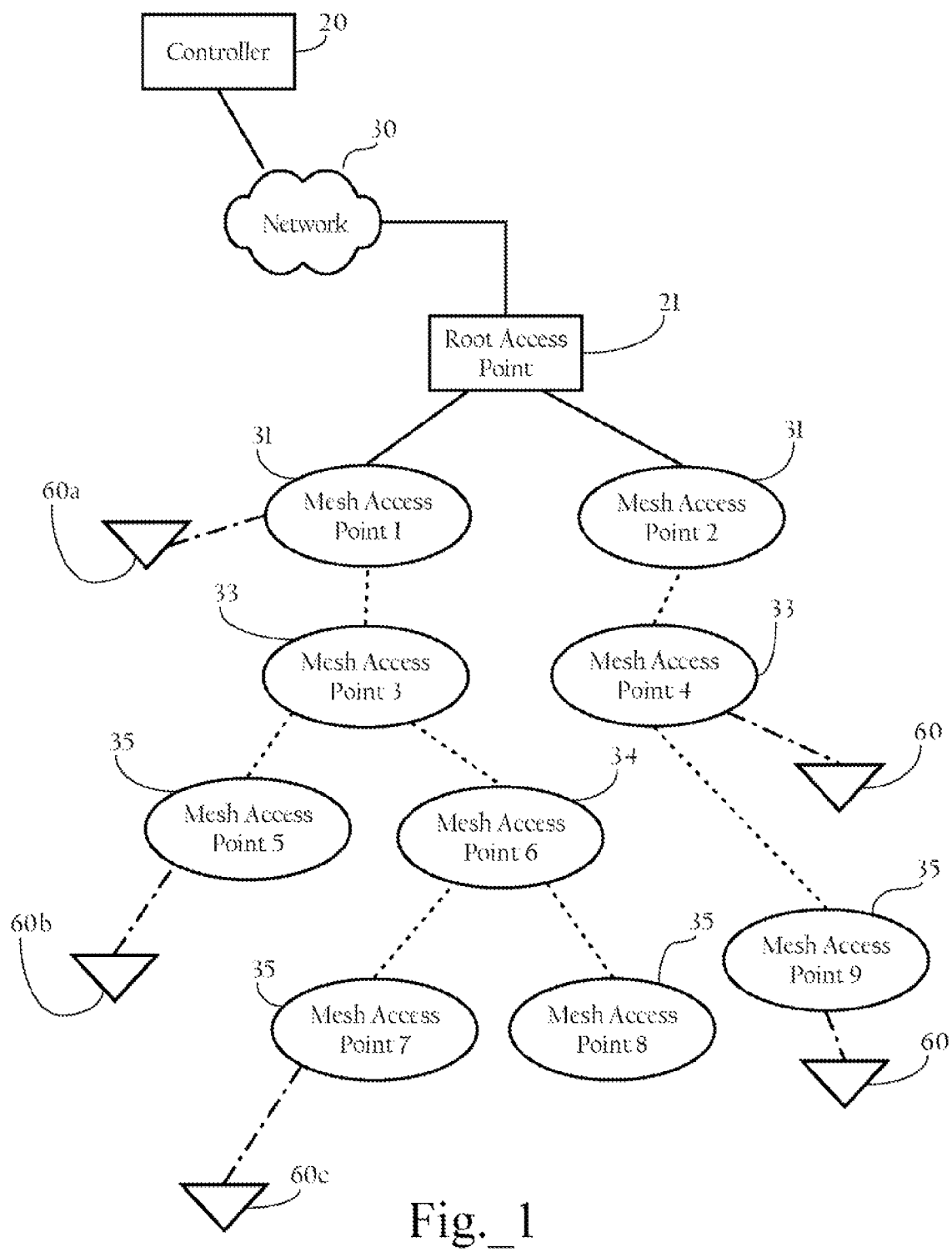
Fig._1

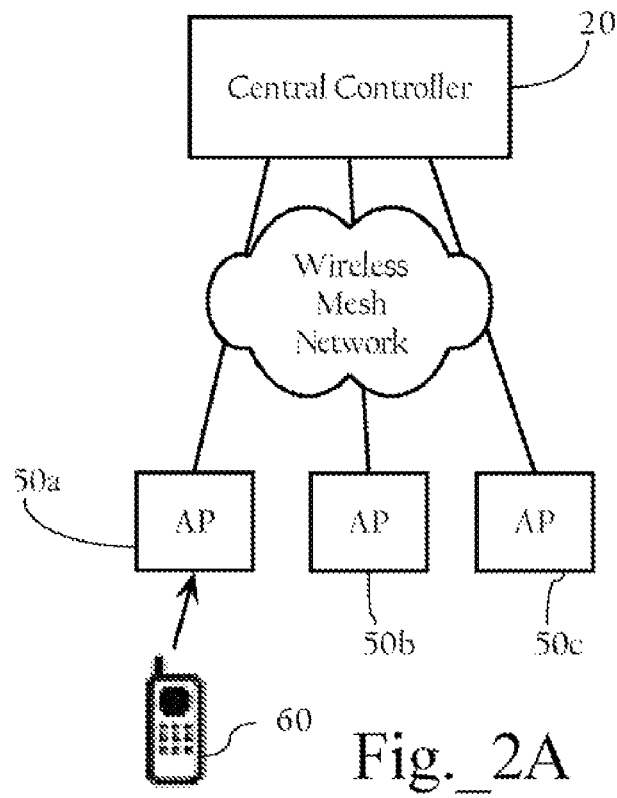
Fig._2A
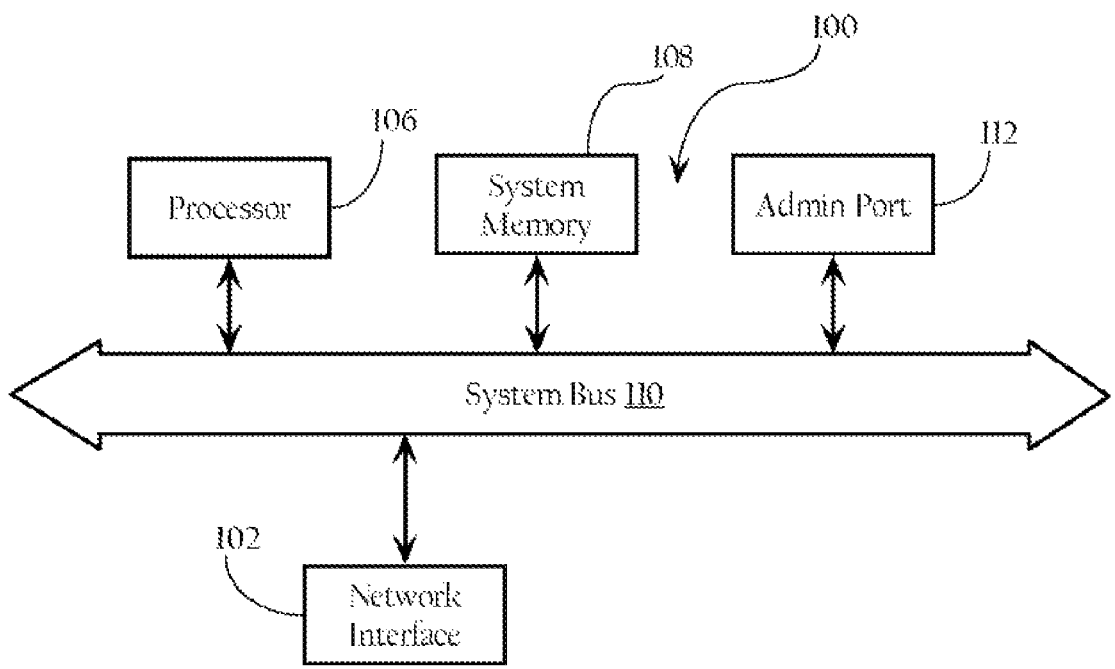
Fig._2B

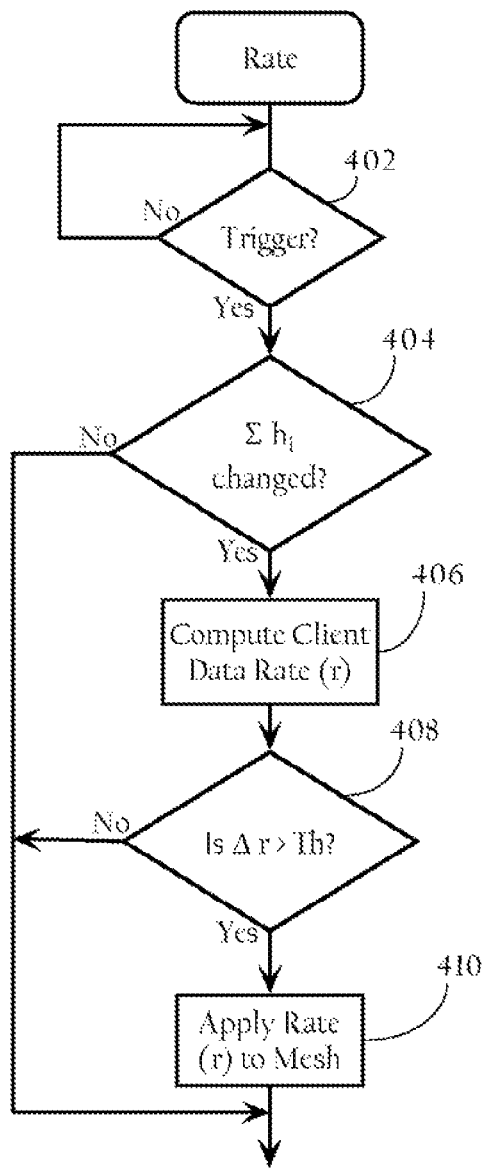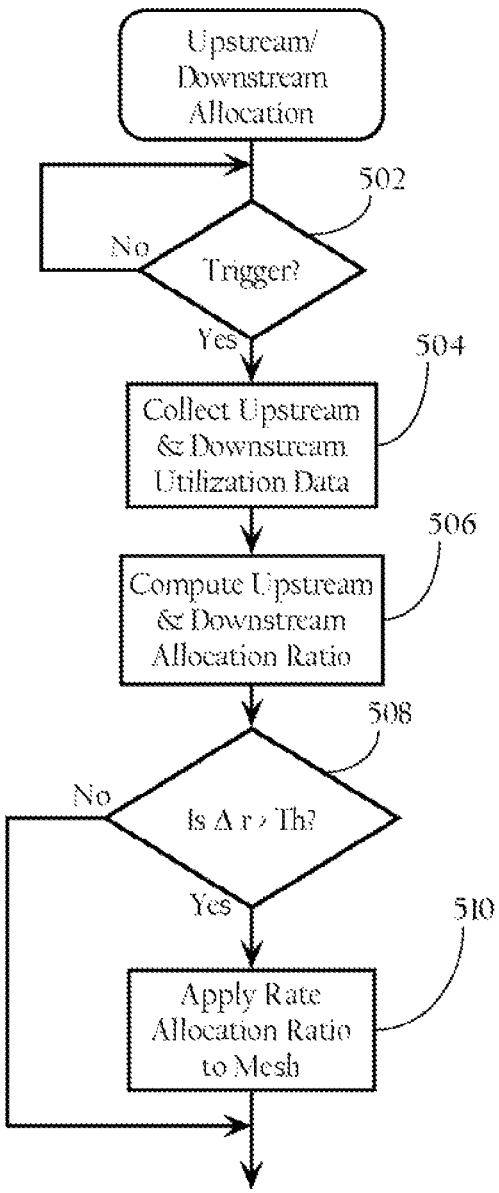
Fig._4
Fig._5

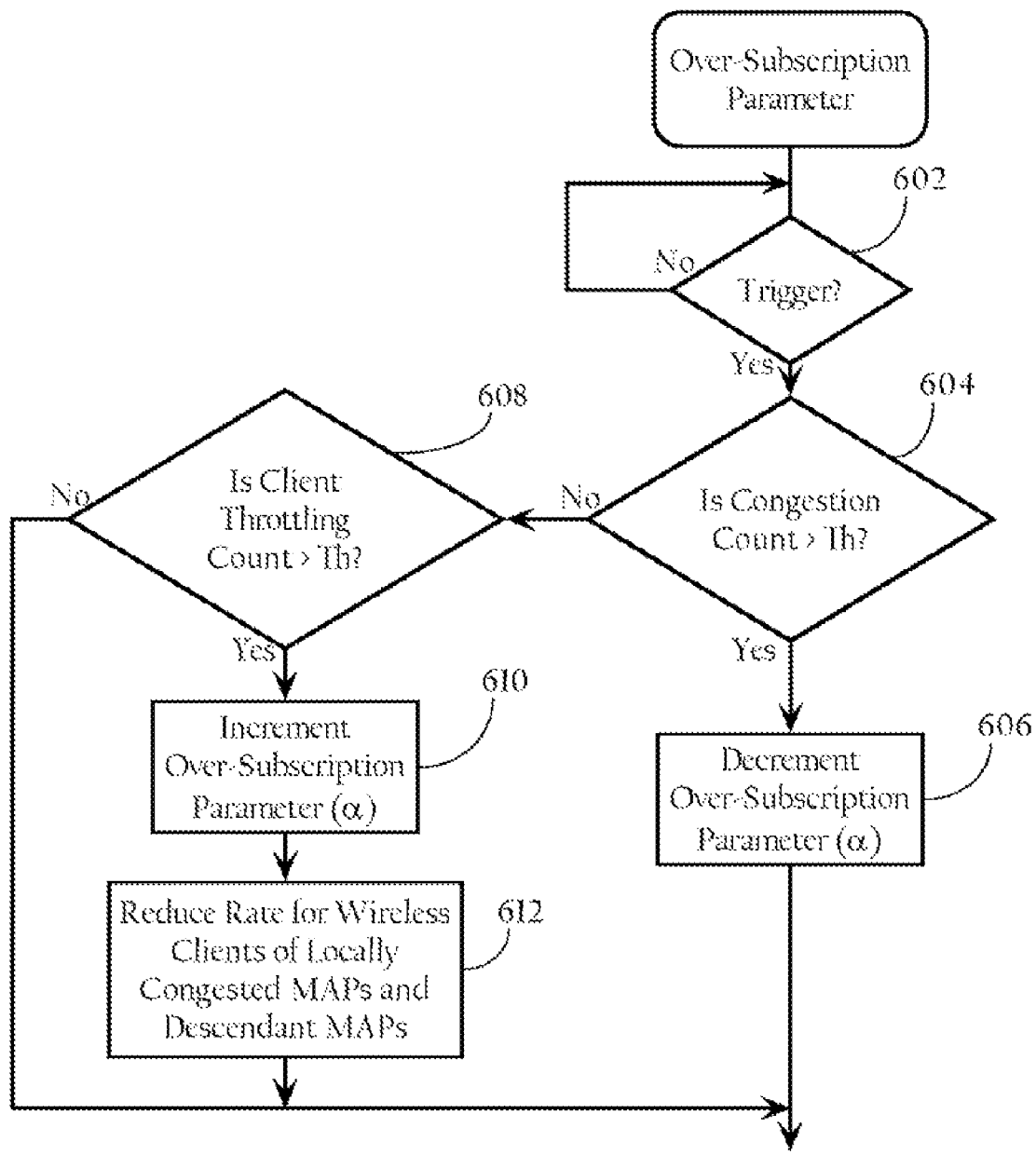
Fig._6

DYNAMIC RATE LIMITING IN WIRELESS MESH NETWORKS

TECHNICAL FIELD

This disclosure relates generally to wireless mesh networks.

BACKGROUND

Market adoption of wireless LAN (WLAN) technology has exploded, as users from a wide range of backgrounds and vertical industries have brought this technology into their homes, offices, and increasingly into the public air space. This inflection point has highlighted not only the limitations of earlier-generation systems, but also the changing role that WLAN technology now plays in people's work and lifestyles across the globe Indeed, WLANs are rapidly changing from convenience networks to business-critical networks. Increasingly users are depending on WLANs to improve the timeliness and productivity of their communications and applications, and in doing so, require greater visibility, security, management, and performance from their network.

Wireless mesh networks have become increasingly popular. A typical wireless mesh network consists of mesh access points (e.g., Cisco SkyCaptain mesh access points) and wireless clients. To construct self-forming and self-healing multi-hop wireless mesh networks, each mesh access point finds a route back to a root node. The routing protocols used by the mesh access points generally form a hierarchical routing configuration, according to which backhaul traffic is forwarded between a root node and multiple mesh access points. Wireless mesh networks can include one or more mesh access points (mesh APs or MAPs) including a backhaul radio for transmission of traffic across the mesh backhaul between other mesh nodes, and a client radio for wireless client traffic. Because the mesh backhaul carries aggregated wireless traffic from many users in the network, consumption of the backhaul bandwidth and, thus, congestion and queue overflow can occur. A variety of rate limiting an bandwidth management schemes have been employed in wired networks; however, these rate limiting technologies fail to account for some differentiating attributes of wireless mesh networks.

DESCRIPTION OF THE DRAWINGS

FIG. 1 illustrates an example topological diagram of a hierarchical wireless mesh network.

FIG. 2A illustrates a schematic, logical view of the hierarchical relationship between mesh access points and a controller.

FIG. 2B illustrates an example hardware system, which may be used to implement a controller.

FIG. 4 illustrates an example flow diagram directed to computing a rate limit for wireless client traffic according to one implementation of the invention.

FIG. 5 illustrates an example method directed to computing an allocation of the rate limit between upstream and downstream traffic.

FIG. 6 illustrates an example method directed to adjusting an oversubscription parameter based on one or more detected conditions.

DESCRIPTION OF EXAMPLE EMBODIMENTS

A. Overview

Figure 3A:
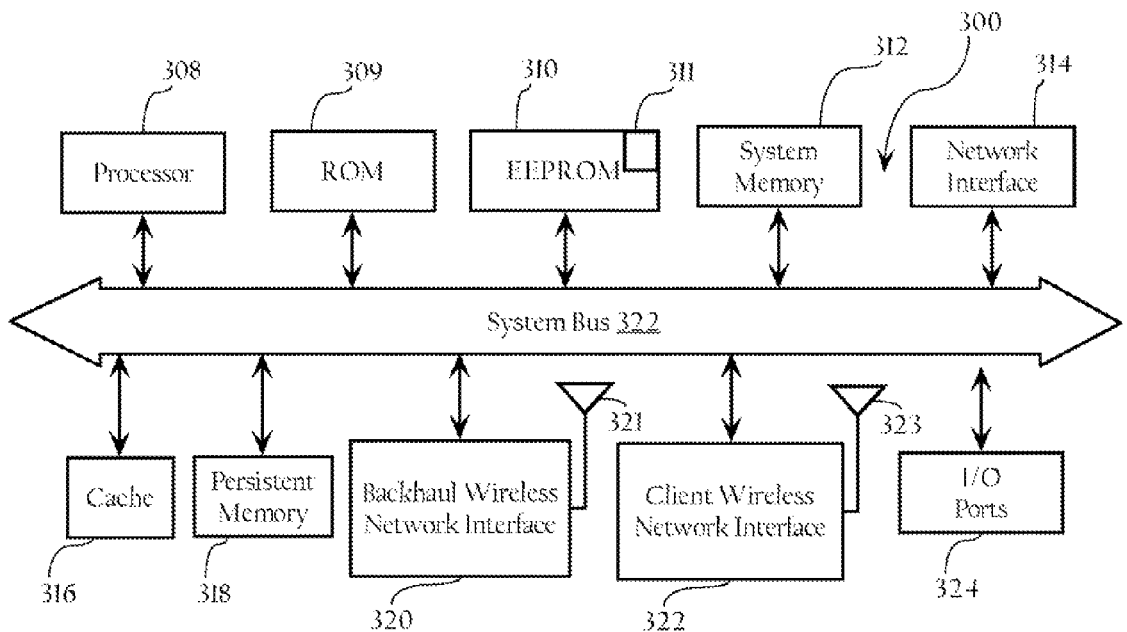
FIG. 3A illustrates for didactic purposes a hardware system 300, which may be used to implement a mesh access point.

Particular implementations facilitate the implementation of dynamic rate limiting mechanisms wireless mesh networks. In a particular implementation, a rate limiting mechanism dynamically limits the allowed client data rate based on the number of active clients in the mesh network and the hop count information of the clients. The data rate supported by mesh access points is essentially shared among all neighboring MAPs, meaning that, due to contention, each MAP receives a fraction of the available bandwidth. Furthermore, intermediate MAPs that accept data from neighboring MAPs can suffer from a queue overflow problem. Since TCP is very sensitive to packet drops, TCP throughput can be affected greatly by congestion in the network and queue overflow. Additional, in a multi-hop mesh network, effective bandwidth decreases approximately linearly with increasing hop count, mainly due to increased spatial contention. Flows that travel through more network hops suffer lower throughput, which is may be undesirable from the perspective of a service provider. For example, a client that is three hops away from a root AP (RAP) can only achieve at most one third of the throughput that a one-hop client can achieve. If each client is allowed to transmit at will, aggressive one-hop clients may starve multi-hop clients. Accordingly, implementations of the present invention incorporate hop count information as a factor in computing the client data rates for the mesh network. In some particular implementations, the rate limiting mechanism of the invention dynamically allocates the available mesh bandwidth between upstream and downstream traffic by enforcing an upstream and downstream client data rate. In particular implementations, the dynamic rate limiting mechanism may also adjust client data rates based on observed congestion at one or more mesh access points.

In a mesh network according to one particular implementation, mesh APs are maintained and managed by one or more controllers. Each controller can manage up to a certain number of mesh APs. In one implementation, a mesh tree is as a routing tree that is rooted at one Root AP (RAP). In some implementations, mesh APs on each mesh tree are managed by one controller. In the case where more than one controller is used for one mesh tree, a management server is used to manage information from multiple controllers. In a particular implementation, the dynamic rate limiting mechanisms are enforced at two entities in the mesh network—the controller, and at each mesh access point in the mesh network. In one implementation, the controller calculates the average allowed upstream and/or downstream client data rate for each client and informs the mesh APs. MAPs and the controller implement a rate limiting mechanism, a token bucket algorithm, to limit the client data rate of each user. The egress transmit rate of the rate limiting mechanism is set dynamically by the controller based on conditions observed across the mesh network.

B. Example Wireless Mesh Network System Architecture

B.1. Network Topology

FIG. 1 illustrates a wireless mesh network according to one implementation of the present invention. In one implementation, the wireless mesh network includes a wireless mesh controller 20, a root access point 21, and a plurality of child wireless mesh access points. In one implementation, the mesh access points are logically arranged in a hierarchy for purposes of routing traffic to the root access point (RAP), and on to a network. In one implementation, this hierarchy can be dynamically configured and shifted based on discovery of wireless management messages between wireless mesh access points, or statically configured.

In one implementation, a hierarchical architectural overlay is imposed on the mesh network of routing nodes to create a downstream direction towards leaf routing nodes 35, and an upstream direction toward the root access point 21. For example, in the hierarchical mesh network illustrated in FIG. 1, the first hop mesh access point 31 is the parent of intermediate mesh access point 33. In addition, intermediate mesh access points 33 and 34 are the parent to leaf mesh access point 35. In one implementation, this hierarchical relationship is used in routing packets between wireless clients 60, or between wireless clients 60 and network 30. Of course, a variety of wireless mesh network configurations are possible, including non-hierarchical configurations, and hierarchical configurations with fewer or greater number of hierarchical tree structures.

The mesh access points in the mesh network, in one implementation, generally include one radio, operating in a first frequency band, and associated wireless communication functionality to communicate with other mesh access points to thereby implement the wireless backbone, as discussed more fully below. All or a subset of the mesh access points, in one implementation, also include an additional radio, operating in a second, non-interfering frequency band, and other wireless communication functionality to establish and maintain wireless connections with mobile stations, such as wireless client 60. For example, in 802.11 wireless networks, the backbone radios on the wireless routing nodes may transmit wireless packets between each other using the 802.11a protocol on the 5 GHz band, while the second radio on each mesh access point may interact with wireless clients on the 2.4 GHz band (802.11b/g). Of course, this relation can also be reversed with backhaul traffic using the 802.11b/g frequency band, and client traffic using the 802.11a band. In addition, the mesh access points may include only a single radio or additional radios.

In one implementation, some wireless mesh networks can include a controller and a plurality of mesh access points that are configured into one or more routing and control hierarchies based on automatic neighbor and route discovery protocols. In some environments, individual mesh access points automatically discover their neighbors and configure hierarchical routing configurations by selecting parent nodes based on a variety of factors. Mesh access points, in some systems, connect to a wireless controller through one or more parents nodes in the routing hierarchy.

B.2. Controller

FIG. 2A illustrates the logical relationship between mesh access points and controller 20 relative to wireless clients, according to one possible implementation of the invention. In one implementation, the mesh access points, in connection with the controller 20, implement a hierarchical processing scheme for management of wireless connections with clients 60. For example, each mesh access point may be configured to autonomously implement time-critical link layer functions (such as transmitting acknowledgements), while encapsulating and forwarding wireless management frames (e.g., association requests, etc.) and other client traffic to controller 20 for processing. The encapsulated frames may traverse one or more intermediate mesh access points in the mesh hierarchy as indicated by FIG. 2A.

In other implementations, the controller 20 may be implemented as a wireless domain server (WDS). If the controller 20 is implemented as a WDS, the client side access functionality implemented by the mesh access points may comprise autonomous or so-called "fat" wireless access points. Of course, a variety of other mesh routing and control schemes can be used in connection with the real-time transport protocol described herein.

FIG. 2B illustrates an example hardware system 100, which may be used to implement a controller 20. As FIG. 2B shows, in one implementation, the central controller 20 includes a network interface 102. Controller 20, in one implementation, further comprises a processor 106, a memory 108, one or more software modules stored in memory 108, including instructions for performing the functions described herein, and a system bus 110 operably connecting these components. The controller may optionally include an administrative port 112 allowing for administrative access for such purposes as configuration and diagnostic access.

B.3. Wireless Mesh Access Point

FIG. 3A illustrates for didactic purposes a hardware system 300, which may be used to implement a wireless mesh access point in a wireless mesh network. In one implementation, the wireless mesh access point 300 comprises a processor 308, a read-only memory (ROM) 309, and an electronically erasable read-only memory (EEPROM) 311 including reserved memory space 311 for storing network management information including physical environment and parameter (PEP) information. PEP information may include, for example, antenna orientation, global positioning system (GPS) position, altitude, and height above the ground, etc. The wireless mesh access point 300 may also include one or more of the following: a memory 312, a network interface 314 (e.g., an 802.3 interface) for communication with a LAN, a cache 316 for storing WLAN information, and a persistent memory 318. The wireless mesh access point 300 may also include a backhaul wireless network interface 320 having an antenna 321. Backhaul wireless network interface 320 is configured to transmit and receive messages to/from one or more other wireless mesh access points in a mesh network. The wireless mesh access point 300 may also include a client wireless network interface 322 (e.g., an IEEE 802.11 WLAN interface) having an antenna 323. Client wireless network interface 322 is configured for wireless communication with one or more wireless clients 60. The wireless mesh access point 300 may also include and a system bus 322 interconnecting these components, input/output (I/O) ports 324, and an optional administration or control port (326).

In some implementations, wireless mesh access point use one or more of the following standards: WiFi/802.11, WiMax/802.16, 2G, 3G, or 4G Wireless, Bluetooth/802.15, Zigbee, or any other suitable wireless communication standards. In one implementation, wireless mesh access point may have a separate access radio, and associated interface components, for communicating with a wireless client or other portable computer. The wireless mesh access points may also include software modules, including Dynamic Host Configuration Protocol (DHCP) clients, transparent bridging, Lightweight Access Point Protocol (LWAPP), Cisco® Discovery Protocol (CDP) modules, wireless access point modules, Simple Network Management Protocol (SNMP) functionality, etc., and device drivers (e.g., network and WLAN interface drivers) stored in persistent memory 318 (e.g., a hard disk drive, flash memory, EEPROM, etc.). At start up, these software components are loaded into system memory 312 and then accessed and executed by processor 310. In one implementation, the wireless mesh access point includes software or firmware modules for recognizing the reception of network management information (e.g., PEP data) and for storing such information in memory (e.g., EEPROM 310).

Figure 3B:
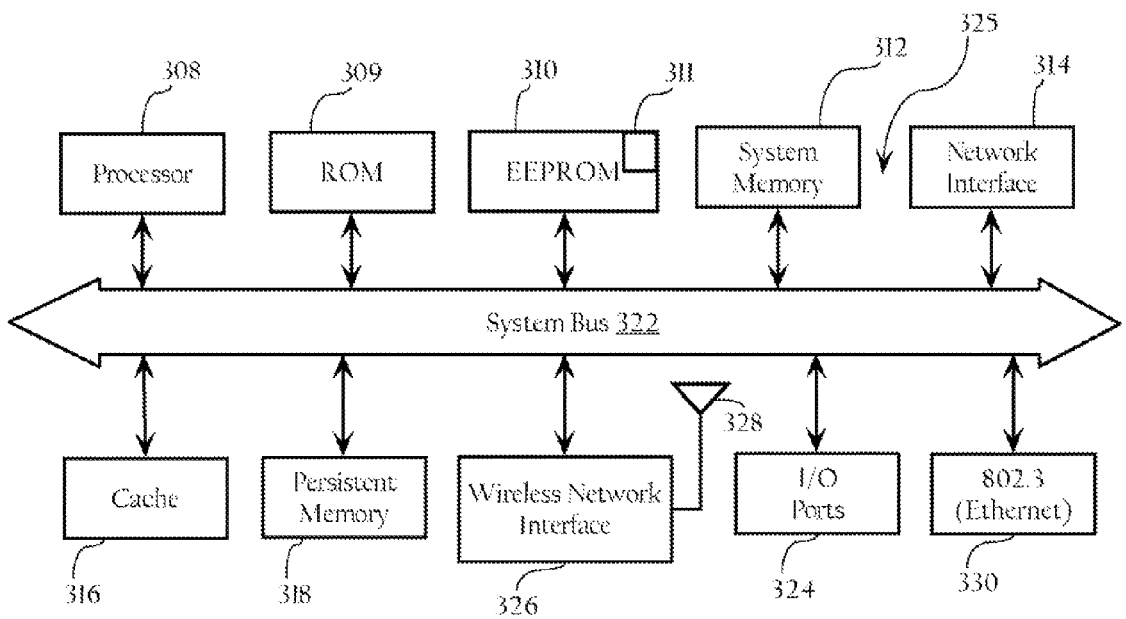
FIG. 3B illustrates for didactic purposes a hardware system 325, which may be used to implement a mesh access point in accordance with another implementation.

FIG. 3B illustrates for didactic purposes a hardware system 325, which may be used to implement a wireless mesh access point in a wireless mesh network, in accordance with another implementation. In one implementation, the wireless mesh access point 325 may have similar components to that of wireless mesh access point 300 of FIG. 3A except that wireless mesh access point 325 of FIG. 3B includes wireless network interface 326 and antenna 328 instead of backhaul wireless network interface 320, antenna 321, client wireless network interface 322, and antenna 323. Furthermore, wireless mesh access point 325 also includes an 802.3 (Ethernet) interface 330.

B.4. Rate Enforcement

In particular implementations, controller 20 and mesh access points each include functionality directed to enforcing the client data rates computed by the dynamic rate limiting mechanisms described herein. In one implementation, since controller 20 is operatively disposed to receive network traffic destined for the wireless clients 60 associated with the MAPs, controller 20 is operative to enforce the client data rate for traffic in the downstream direction. Still further, since the controller 20 is operative to manage the associations between the mesh access points and the wireless clients, it can track the number of clients associated with the mesh and the hop count information of each client. In another implementation, however, root access point 21 can be configured to enforce client data rate in the downstream direction. To enforce the client data rate in the upstream direction, each mesh access point, in one implementation, includes rate control functionality. For example, client traffic received at client wireless network interface 322 is passed to a rate enforcement module. The rate enforcement module schedules received packets for delivery, which are then passed to backhaul wireless network interface 320 for transmission.

A variety of rate enforcement mechanisms can be employed to enforce client data rates in the upstream and downstream directions. Example rate enforcement mechanisms include weighted fair queuing, class-based weighted fair queuing, leaky bucket algorithms, token bucket algorithms, and the like. Still further, in one implementation, controller 20 includes functionality directed to collecting mesh network traffic statistics and measurements that are utilized by the rate limiting mechanisms described herein. Furthermore, in one implementation, the rate limiting mechanisms are hosted by controller 20. When a client data rate is computed, controller 20 transmits the upstream client data rates to the mesh access points for enforcement. Furthermore, where controller 20 is operatively associated with more than one root access point (and associated downstream mesh hierarchies), it may apply the dynamic rate limiting algorithm separately relative to the different mesh networks.

C. Rate Limiting Mechanism

In one particular implementation, the dynamic rate limiting mechanisms described herein adjust three parameters that influence the upstream and downstream client data rates enforced on wireless traffic on a per-client basis. As discussed in more detail below, the dynamic rate limiting mechanism can compute an overall client data rate (for upstream and downstream traffic) based on the number of current clients and client hop count information. In some implementations, the dynamic rate limiting mechanism can also dynamically allocate the overall client data rate between the upstream and downstream directions based on observed utilization of the mesh network. Furthermore, the dynamic rate limiting mechanism may adjust an oversubscription parameter that influences the overall client data rate based on congestion observed across the mesh network. In one implementations, adjustments (and possibly events that trigger such adjustments) of overall client data rate, upstream and downstream allocations and the over-subscription parameters may operate independently or dependently of each other. For example, in one implementation, controller 20 to apply the parameters it computes to the mesh network may transmit the overall client data rate, upstream allocation and over-subscription parameter to the mesh access points, which are operative to apply the appropriate upstream client data rate based on the current values of each of these parameters. In another implementation, the controller 20 may compute the upstream client data rate and transmit the new upstream rate to be applied to the mesh access points.

C.1. Overall Client Data Rate

In some mesh networks, the PHY data rate for the mesh backhaul is 18 Mbps, which translates into an application layer data rate of approximately 10.5 Mbps. Traditionally, WLANs measure the traffic load in bits/sec. However, this conventional traffic load measurement is not sufficient for use in a wireless mesh network. In a mesh network, it can take multiple transmits and receives before a data packet finally reaches the destination. Thus, the end-to-end throughput decreases approximately inverse linearly with the increase of hop count—that is, the number of hops away a given client is from the root access point. For example and with reference to FIG. 1, client 60a is one hop away from the root access point 21, while client 60b is 3 hops away. The network load is represented by a weighted sum:

$$L = \sum_i h_i \times l_i,$$

where $h_i$ is the hop count of the ith user and $l_i$ is the usage or traffic load of the ith user.

In one implementation, controller 20 monitors how many clients are currently associated with the mesh tree and the hop count of each user. The controller 20 also maintains a provisioning or over-subscription factor, denoted for didactic purposes by $\alpha$, to represent the percentage of mesh network capacity that can be utilized. In one implementation, the total available network capacity, denoted by C, is about 10.5 Mbps at the application layer. For instance, to provide a safety margin against over-provisioning, it can be determined that the maximum available bandwidth for provisioning is 80% of the total available network capacity. In the alternative, since network traffic may often be bursty, to achieve high bandwidth utilization at the expense of occasional congestion, the threshold $\alpha$ can be set to more than 100%.

Based on the weighted sum (above), the controller 20 can calculate the average client data rate as:

$$r = \frac{\alpha \cdot C}{\sum_i^N h_i}.$$

The parameters in the rate formula that may change dynamically are the number of clients (N) and the hop count information of each client ($h_i$). In one implementation, execution of the client data rate algorithm can be triggered when a user leaves the network or when a new user joins the network. As discussed in more detail below, the overall client data rate is allocated between upstream and downstream traffic.

FIG. 4 illustrates an example method for dynamically adjusting client data rate. As FIG. 4 illustrates, the controller 20, when a trigger event occurs (402), determines whether the sum of all client hop counts has changed (404). In some particular implementations, the trigger event may include the association of a new client to the mesh, a client disassociating from the mesh, a change in parent-child relationships in the wireless mesh network, and/or existing client roaming from one mesh access point in the mesh tree to another mesh access point in the mesh tree. Still further, the controller 20 may be configured to re-compute the client data rate at periodic intervals, in response to detected congestion, or based on some other condition. Accordingly, the trigger event can be the occurrence of a time based condition, a congestion event, a threshold number of dropped packets, and the like. Furthermore, as discussed above, controller 20 re-computes the client data rate if $$\sum_{i}^{N} h_i$$

changes. For example, the number of clients N may change, however, the sum of the hop counts for all clients may not change.

If the aggregate hop count has changed (404), controller 20 re-computes the client data rate (406), as discussed above, based on the current number of clients (N) and the aggregate hop count across the active clients. In one implementation, controller 20 conditionally applies the newly computed rate to the mesh (410), if the difference between the currently applied rate and the newly computed rate, Δr, is greater than a threshold value (408).

C.2. Upstream-Downstream Allocation

Because network traffic flows in both the upstream and downstream directions, the controller 20, in one implementation, determines how much share of r should be allocated to between upstream and downstream traffic. This allocation, in one implementation, is performed based on the measurements of client traffic. Initially, the upstream share and the downstream share are set to be equal—i.e., r_u=r_d=50%*r, where r_u is the upstream client date rate and r_d is the downstream client data rate. Then, based on the measurements client traffic, the controller 20 periodically updates r_u and r_d to reflect client traffic characteristics. The update period can either be fixed or can be increased dynamically. For instance, the first update may be set to t minutes after the initial data rates are set and the ith update may be set to 2'+t minutes, up to a certain pre-defined maximum update period.

FIG. 5 illustrates an example method for adjusting the allocation of client data rate to upstream and downstream traffic. As FIG. 5 illustrates, controller 20, in response to a trigger event 502, collects upstream and downstream utilization data (504) and determines the allocation between upstream and downstream traffic based on the ratio of observed upstream traffic to observed downstream traffic (506). Controller 20, in one implementation, may also apply the new allocation ratio to the mesh network (510), if the change in upstream and or downstream client data rate would exceed a threshold (508).

The rigger condition can be a threshold period of time, or any other condition. In one implementation, the trigger event may be the computation of a new overall client data rate. As discussed above, since, in one implementation, upstream and downstream traffic passes through controller 20, it tracks utilization of the mesh in the upstream and downstream traffic (in one implementation, by incrementing MIB counters in response to upstream/downstream packets). The analysis of upstream and downstream traffic can vary considerably. For example, the analysis can be performed relative to a sliding window, a weighted moving average, an exponential weighted moving average. In other implementations, the start of the analysis window may remain static for a period of time or until reset, while the end of the analysis window grows at each analysis interval.

C.3. Over-Subscription Parameter Modulation

Additionally, the provisioning or over-subscription factor, α, can be dynamically determined to adapt to detected congestion. There are many candidate algorithms for adapting α, including multiplicative increase, multiplicative decrease (i.e. akin to Least Mean Squares, LMS), and linear increase multiplicative decrease (LIMD) (i.e. akin to TCP congestion control). LIMD is the preferred embodiment. In addition, α may be adapted based on a variety of different network measurements. The parameter α can be adjusted based on the total demand versus the available capacity. The controller measures the total traffic load. If the total traffic load is much lower than the available capacity, α is increased. If the total traffic load is getting close to the available network capacity, α may be reduced.

The parameter α can also be adapted based on the number of client throttling events and the number of congestion events detected in the mesh network. Each time a packet is dropped due to queue overflow, a counter associated with the queue is incremented. A MAP, as discussed above, has a client access radio interface and a backhaul radio interface. When the packet drop occurs at the client access radio interface because of overflow of the queue to which upstream client packets are added for transmission across the backhaul, a client throttling event is recorded. When the packet drop occurs at the backhaul radio interface because of congestion on the backhaul, a congestion event is recorded. MAPs report the numbers of events to the controller 20 periodically. Upon receiving these statistics from MAPs, the controller 20 examines the total number of client throttling events and the total number of queued packet drop (congestion) events. If both numbers are below their pre-defined thresholds, the controller does not change α. If the number of congestion events is above the congestion threshold, the controller reduces the value of α to mitigate the congestion in the network.

FIG. 6 illustrates an example method for adjusting the over-subscription or provisioning parameter, α. In the implementation shown, controller 20, responsive to a trigger event (602), determines whether the congestion event counter exceeds a threshold (604). If so, controller 20 decrements the provisioning parameter, α, by a configurable amount (606). If not, controller 20 determines whether the client throttling event counter exceeds a threshold (608) If so, controller 20 increments the provisioning parameter, α, by a configurable amount (610). In a particular implementation, the primary goal of the rate limiting algorithm is to reduce the number of congestion events in the network. The secondary goal is to reduce the number of client throttling events occurring at the edge of the network. Thus, only when the number of congestion events is below the congestion threshold and the number of client throttling events is above the client throttling threshold does the controller increase α to reduce the number of client throttling events. In particular implementations, the trigger event (502) may be a timeout and/or a threshold number of detected congestion events.

In a further enhancement, rate limiting may be applied locally. If there is no network-wide congestion, the controller can sort the MAPs based on the number of congestion events recorded. The MAPs that experience the most congestion are identified. The controller can then reduce the data rate limits on the clients associated with the congested MAPs and all descendents (612) in order to mitigate the local congestion level (as indicated by the number of client throttling events).

For didactic purposes, assume there are two users in the mesh network, a first client is one hop away from the RAP and the other is three hops away from the RAP. Further assume that the over-subscription parameter is set to 1.20, which represents 120% of the total network capacity—i.e., about 12.6 Mpbs. Instead of assigning each user an allowed data rate of 6.3 Mbps, the controller recognizes one user is 3 hops away. Thus the allowed data rate for each user is 12.4/(1+3) =3.1 Mbps. By taking the hop count into consideration, the rate limiting algorithm reflects the real traffic load in a multi-hop mesh network.

C.4. Possible Enhancements

In addition, this rate limiting algorithms can be modified to implement differentiated service levels for wireless client traffic. For example, some implementations of the invention can be configured to support a subscription model where subscribers pay different service charges to get different levels of service. For instance, a subscriber may pay $30 a month to receive twice as bandwidth than a subscriber pays $20 a month. Taking this into consideration, the controller may calculate the average data rate for the users subscribed to the basic service according to the following formula:

$$r = \frac{\alpha \cdot C}{\sum_i (s_i \cdot h_i)},$$

where $s_i$ is the service level of the ith user and represents a multiple of the end-to-end data rate a user receives over the basic data rate. For instance, $s_i=1$ is the basic service level. For a user that has a higher service level, the allowed data rate is $s_i 19$ r. S, in one implementation, varies between 1 and a maximum level.

If QoS is supported in the mesh network, the rate limiting mechanisms described herein can also consider QoS support and call admission control (CAC). For instance, lower priority packets can be dropped before higher priority packets. Furthermore, rate limiting can be applied in differentiated manners relative to each protocol. For example, the default scheme is to apply a token bucket algorithm on all packets (including UDP packets). TCP traffic, however, can be controlled in a more sophisticated manner: the TCP transmission rate can be limited by a token bucket limiting the TCP ACK return rate. The withholding of TCP ACKs causes throttling of the transmission at the source, before data packets enter the network. In addition, this method requires buffering only the relatively short TCP ACK packets in the mesh APs, not the longer TCP data packets.

The present invention has been explained with reference to specific embodiments. For example, while embodiments of the present invention have been described as operating in connection with IEEE 802.11 networks, the present invention can be used in connection with any suitable wireless network environment. Other embodiments will be evident to those of ordinary skill in the art. It is therefore not intended that the present invention be limited, except as indicated by the appended claims.

What is claimed is:

1. Logic encoded in one or more tangible media for execution and when executed operable to:
    monitor one or more clients associated with a hierarchical wireless mesh network and the respective hop counts of the clients to a root mesh node of the wireless mesh network, wherein the wireless mesh network further comprises one or more mesh access points;
    determine, responsive to one or more events, a first client data rate for one or more clients of the wireless mesh network based on the number of current clients and the respective hop counts of the current clients;
    apply the first client data rate to the wireless mesh network for respective one or more clients individually by using a rate control algorithm to control the flow of packets destined for, or transmitted by, the respective clients into the wireless mesh network according to the first client data rate for each client;
    determine, responsive to one or more additional events, that a sum of all client hop counts in the wireless mesh network has changed;
    responsive to the determination that the sum of all of the client hop counts has changed, determine a second client data rate for the one or more clients;
    determine whether the second client data rate is different from the first client data rate by a threshold;
    responsive to the determination that the second client data rate is different from the first client data rate by the threshold, apply the second client data rate to the wireless mesh network; and
    responsive to the determination that the second client data rate is not different from the first client data rate by the threshold, continue to apply the first client data rate to the wireless mesh network.

2. The logic of claim 1 wherein the logic is further operable to:
    determine a first allocation of the first client data rate between the upstream and downstream traffic of the clients;
    apply the first allocation of the first client data rate between the upstream and downstream traffic of the clients to the wireless mesh network;
    determine a second allocation of the first client data rate between the upstream and downstream traffic of the clients;
    determine whether the second allocation of the first client data rate between the upstream and downstream traffic of the clients causes change in the upstream and downstream traffic that exceeds a change threshold;
    responsive to the determination that the second allocation of the first client data rate between the upstream and downstream traffic of the clients causes change in the upstream and downstream traffic that exceeds the change threshold, apply the second allocation of the first client data rate between the upstream and downstream traffic of the clients to the wireless mesh network; and
    responsive to the determination that the second allocation of the first client data rate between the upstream and downstream traffic of the clients does not cause change in the upstream and downstream traffic that exceeds the change threshold, continue to apply the previous allocation of the first client data rate between the upstream and downstream traffic of the clients to the wireless mesh network.

3. The logic of claim 1 wherein an over-subscription parameter is operative to modify the first client data rate, and wherein the logic is further operable to adjust the over-subscription parameter based on measured utilization of the wireless mesh network.

4. The logic of claim 1 wherein an over-subscription parameter is operative to modify the first client data rate, and wherein the logic is further operable to adjust the over-subscription parameter based on one or more detected congestion events.

5. The logic of claim 4 wherein the logic is operable to decrease the over-subscription parameter, responsive to a threshold number of congestion events.

6. The logic of claim 4 wherein the logic is operable to:
determine that the one or more detected congestion events do not exceed a congestion event threshold;
responsive to the determination that the one or more detected congestion events do not exceed the congestion event threshold, determine whether one or more detected client throttling events exceed a client throttling event threshold;
responsive to the determination that the one or more detected client throttling events exceed the client throttling event threshold, increase the over-subscription parameter; and
responsive to the determination that the one or more detected client throttling events do not exceed the client throttling event threshold, keep the over-subscription parameter unadjusted.

7. The logic of claim 1 wherein the first client data rate applied to a given client is further based on a service level.

8. The logic of claim 7 wherein the logic is further operable to determine the first client data rate for one or more clients of the wireless mesh network based on the number of current clients and the respective hop counts and service levels of the current clients.

9. The logic of claim 1 wherein the logic is further operable to transmit an upstream client data rate based on the determined first client data rate to one or more mesh access points of the wireless mesh network.

10. The logic of claim 1 wherein the logic is further operable to selectively reduce the first client data rate of clients of locally congested elements of the wireless mesh network.

11. A method, comprising:
monitoring one or more clients associated with a hierarchical wireless mesh network and the respective hop counts of the clients to a root mesh node of the wireless mesh network, wherein the wireless mesh network further comprises one or more mesh access points;
determining, responsive to one or more events, a first client data rate for one or more clients of the wireless mesh network based on the number of current clients and the respective hop counts of the current clients; and
applying the first client data rate to the wireless mesh network for respective one or more clients individually by using a rate control algorithm to control the flow of packets destined for, or transmitted by, the respective clients into the wireless mesh network according to the first client data rate for each client;
determining, responsive to one or more additional events, that a sum of all client hop counts in the wireless mesh network has changed;
responsive to the determination that the sum of all of the client hop counts has changed, determining a second client data rate for the one or more clients;
determining whether the second client data rate is different from the first client data rate by a threshold;
responsive to the determination that the second client data rate is different from the first client data rate by the threshold, applying the second client data rate to the wireless mesh network; and
responsive to the determination that the second client data rate is not different from the first client data rate by the threshold, continuing to apply the first client data rate to the wireless mesh network.

12. The method of claim 11 wherein the method further comprises:
determining a first allocation of the first client data rate between the upstream and downstream traffic of the clients;
applying the first allocation of the first client data rate between the upstream and downstream traffic of the clients to the wireless mesh network;
determining a second allocation of the first client data rate between the upstream and downstream traffic of the clients;
determining whether the second allocation of the first client data rate between the upstream and downstream traffic of the clients causes change in the upstream and downstream traffic that exceeds a change threshold;
responsive to the determination that the second allocation of the first client data rate between the upstream and downstream traffic of the clients causes change in the upstream and downstream traffic that exceeds the change threshold, applying the second allocation of the first client data rate between the upstream and downstream traffic of the clients to the wireless mesh network; and
responsive to the determination that the second allocation of the first client data rate between the upstream and downstream traffic of the clients does not cause change in the upstream and downstream traffic that exceeds the change threshold, continuing to apply the previous allocation of the first client data rate between the upstream and downstream traffic of the clients to the wireless mesh network.

13. The method of claim 11 wherein an over-subscription parameter is operative to modify the first client data rate, and wherein the method further comprises adjusting the over-subscription parameter based on measured utilization of the wireless mesh network.

14. The method of claim 11 wherein an over-subscription parameter is operative to modify the first client data rate, and wherein the method further comprises adjusting the over-subscription parameter based on one or more detected congestion events.

15. The method of claim 14 wherein the method further comprises decreasing the over-subscription parameter, responsive to a threshold number of congestion events.

16. The method of claim 14 wherein the method further comprises:
determining that the one or more detected congestion events do not exceed a congestion event threshold;
responsive to the determination that the one or more detected congestion events do not exceed the congestion event threshold, determining whether one or more detected client throttling events exceed a client throttling event threshold;
responsive to the determination that the one or more detected client throttling events exceed the client throttling event threshold, increasing the over-subscription parameter; and
responsive to the determination that the one or more detected client throttling events do not exceed the client throttling event threshold, preventing adjustment of the over-subscription parameter.

17. The method of claim 11 wherein the first client data rate applied to a given client is further based on a service level.

18. The method of claim 17 wherein the method further comprises determining the first client data rate for one or more clients of the wireless mesh network based on the number of current clients and the respective hop counts and service levels of the current clients.

19. The method of claim 11 wherein the method further comprises transmitting an upstream client data rate based on the determined first client data rate to one or more mesh access points of the wireless mesh network.

20. The method of claim 11 further comprising selectively reducing the first client data rate of clients of locally congested elements of the wireless mesh network.

21. A wireless mesh network comprising
a controller operative to:
    monitor one or more clients associated with a wireless mesh network and the respective hop counts of the clients to a root mesh node of the wireless mesh network;
    determine, responsive to one or more events, a first client data rate for one or more clients of the wireless mesh network based on the number of current clients and the respective hop counts of the current clients; and
    provide an upstream client data rate derived from the first client data rate to one or more wireless mesh access points;
    enforce a downstream client data rate derived from the first client data rate to network traffic of the one or more clients by using a rate control algorithm to control the flow of packets destined for the respective clients into the wireless mesh network according to the first client data rate for each client;
    determine, responsive to one or more additional events, that a sum of all client hop counts in the wireless mesh network has changed;
    responsive to the determination that the sum of all of the client hop counts has changed, determine a second client data rate for the one or more clients;
    determine whether the second client data rate is different from the first client data rate by a threshold;
    responsive to the determination that the second client data rate is different from the first client data rate by the threshold, apply the second client data rate to the wireless mesh network; and
    responsive to the determination that the second client data rate is not different from the first client data rate by the threshold, continue to apply the first client data rate to the wireless mesh network; and
a plurality of wireless mesh access points in a wireless mesh network operative to:
    maintain wireless connections with one or more clients;
    forward upstream traffic of the one or more clients across the wireless mesh network to a root node;
    receive downstream traffic of the one or more clients across the wireless mesh network from the root node;
    enforce the upstream client data rate on network traffic of the one or more clients by using a rate control algorithm to control the flow of packets transmitted by the respective clients into the wireless mesh network according to the first client data rate for each client.

\* \* \* \* \*